US007085740B1

(12) United States Patent
Meyers (10) Patent No.: US 7,085,740 B1
(45) Date of Patent: Aug. 1, 2006

(54) METHOD AND APPARATUS FOR CONDUCTING AUCTIONS

(76) Inventor: Raphael Meyers, 56 W. Beach St., Long Beach, NY (US) 11561

( * ) Notice: Subject to any disclaimer, the term of this patent is extended or adjusted under 35 U.S.C. 154(b) by 514 days.

(21) Appl. No.: 09/679,183

(22) Filed: Oct. 4, 2000

Related U.S. Application Data

(60) Provisional application No. 60/221,696, filed on Jul. 31, 2000, provisional application No. 60/173,956, filed on Dec. 30, 1999, provisional application No. 60/166,477, filed on Nov. 19, 1999, provisional application No. 60/157,433, filed on Oct. 4, 1999.

(51) Int. Cl.
*G06F 17/60* (2006.01)
(52) U.S. Cl. .......................................... 705/37; 705/35
(58) Field of Classification Search .................. 705/37, 705/80, 5, 26, 35
See application file for complete search history.

(56) References Cited

U.S. PATENT DOCUMENTS

| | | | | |
|---|---|---|---|---|
| 3,581,072 A | * | 5/1971 | Nymeyer | 705/37 |
| 4,554,628 A | * | 11/1985 | Bell | 710/117 |
| 4,789,928 A | * | 12/1988 | Fujisaki | 705/37 |
| 5,394,324 A | * | 2/1995 | Clearwater | 705/8 |
| 5,774,873 A | * | 6/1998 | Berent et al. | 705/26 |
| 5,794,219 A | * | 8/1998 | Brown | 705/37 |
| 5,835,896 A | | 11/1998 | Fisher et al. | 705/37 |
| 5,890,138 A | * | 3/1999 | Godin et al. | 705/26 |
| 5,905,974 A | * | 5/1999 | Fraser et al. | 705/37 |
| 5,905,975 A | | 5/1999 | Ausubel | 705/37 |
| 5,924,082 A | * | 7/1999 | Silverman et al. | 705/37 |
| 5,966,699 A | * | 10/1999 | Zandi | 705/38 |
| 6,006,201 A | * | 12/1999 | Berent et al. | 705/27 |
| 6,012,045 A | | 1/2000 | Barzilai et al. | 705/37 |
| 6,021,398 A | * | 2/2000 | Ausubel | 705/37 |
| 6,035,289 A | * | 3/2000 | Chou et al. | 705/37 |
| 6,044,363 A | * | 3/2000 | Mori et al. | 705/37 |
| 6,055,518 A | * | 4/2000 | Franklin et al. | 705/37 |
| 6,151,589 A | * | 11/2000 | Aggarwal et al. | 705/37 |
| 6,161,099 A | * | 12/2000 | Harrington et al. | 705/37 |
| 6,167,124 A | * | 12/2000 | Johnson et al. | 379/112.01 |

(Continued)

FOREIGN PATENT DOCUMENTS

WO    WO 00/ 41108    7/2000

(Continued)

OTHER PUBLICATIONS

VCOM Final Bid webpage, updated Dec. 14, 2005, 3 pages.*

(Continued)

*Primary Examiner*—Charles R. Kyle
(74) *Attorney, Agent, or Firm*—Cohen, Pontani, Lieberman & Pavane (57) ABSTRACT

A method and system for conducting an on-line auction, in which the bidding is weighted to encourage early and higher bidding. Each time a buyer places a new high bid on an item he is accorded points, weighted to reflect the amount of the bid, either as an absolute value as a relative increase in the high bid compared to prior bids, or in some other fashion. The bid may also be weighted to reflect how long the bid stays the high bid. Thus the bidder is encouraged to place a bid early to have the high bid for as long as possible, and outbid others, so that he does not lose his position as the-high bidder. The invention therefore results in higher bidding, for items offered for sale and yields a more fair and accurate test of the true worth of the item offered for sale.

48 Claims, 1 Drawing Sheet

U.S. PATENT DOCUMENTS

| | | | |
|---|---|---|---|
| 6,202,051 B1 * | 3/2001 | Woolston | 705/27 |
| 6,230,146 B1 * | 5/2001 | Alaia et al. | 705/37 |
| 6,243,691 B1 * | 6/2001 | Fisher et al. | 705/37 |
| 6,266,651 B1 * | 7/2001 | Woolston | 705/27 |
| 6,266,652 B1 * | 7/2001 | Godin et al. | 705/37 |
| 6,606,608 B1 * | 8/2003 | Bezos et al. | 705/36 R |
| 2001/0032175 A1 * | 10/2001 | Holden et al. | 705/37 |
| 2002/0013763 A1 * | 1/2002 | Harris | 705/38 |
| 2002/0099643 A1 * | 7/2002 | Abeshouse et al. | 705/37 |

FOREIGN PATENT DOCUMENTS

| | | |
|---|---|---|
| WO | WO 01/45002 A1 * | 6/2001 |
| WO | WO 03/063036 A1 * | 7/2003 |

OTHER PUBLICATIONS

Ausubel, L. M., An Efficient Ascending-Bid Auction for Multiple Objects, University of Maryland, 2002, 25 pages.*

* cited by examiner

METHOD AND APPARATUS FOR CONDUCTING AUCTIONS

CROSS-REFERENCE TO PRIOR-FILED PROVISIONAL APPLICATIONS

This application claims the benefit of U.S. Provisional Application No. 60/157,433, filed Oct. 4, 1999; No. 60/166,477, filed Nov. 19, 1999; No. 60/173,956, filed Dec. 30, 1999; and No. 60/221,696, filed Jul. 31, 2000.

BACKGROUND OF THE INVENTION

1. Field of the Invention

This invention relates to the field of on-line auctions and, more particularly, to a method for conducting an on-line auction in which bids are evaluated in light of not only their absolute value but also their timing and/or relative value with respect to other bids.

2. Description of the Related Art

Auctions are a time tested method for selling products, and are generally viewed as the best test of an item's worth. Something is worth as much as someone is willing to pay for it. In a traditional live auction, an item is offered for sale, and those persons who are interested in purchasing it bid on it, in increasing increments, until the person who is willing to pay the most acquires the item. This is viewed as the classic measure of the item's true value, as the seller gets the highest price possible for his item, while the buyer knows that he paid no more than necessary to acquire the desired item. For centuries, this system worked well.

A key aspect of the auction is that all of the bidders are in the same place, and the bidding is held in a contracted time period, usually lasting a few minutes, so that the bidders can make their bids with a full and fair opportunity to acquire the items upon which they seek to place bids. The auction gives everyone a fair chance to acquire an item which is up for bid on the auction, and also gives the seller the best chance to sell the item at the best price. It is this sense of equity to all parties which is the strongest virtue of an auction.

In the ever-changing e-commerce world, the concept of on-line auctions (such as those offered by eBay) has taken hold. These auctions are generally similar to live auctions, except that the bidders do not have to be physically present to bid on an item and the bidding takes place over an extended period, lasting days or weeks, so that the item may be bid upon by as many interested buyers as possible.

As on-line auctions have become more popular, some buyers have become adept at gamesmanship to seek to acquire items at less than their full and fair market value.

Since an on-line auction takes place over an extended period of time, it is standard for the seller to set a predetermined time at which the auction will end, even if the bidding has not reached its highest possible level. For example, if a seller offers an item for bid, and sets a deadline for the final bid at 5:00, P.D.T. on September 5, the bid which will win is the highest posted bid at that time, even if it was placed only five seconds before the deadline, and even if there are other buyers who may be willing to pay more, perhaps much more, to acquire the item.

Under this system, a potential buyer has no incentive to place a bid early on in the bidding process, since that will telegraph interest in the item, and give other possibly interested bidders an idea of the perceived value of the item. It is therefore commonplace for bidders to place their true competitive bids in the last few seconds of the auction, even where the item has been offered for sale for days or weeks beforehand. This tends to suppress the amount of the bid, because bidders do not really know what bids they need to exceed to secure the item. Additionally, a bidder who has placed a low, early bid may have a false sense of believing no one else is interested in the item, while, in fact, other bidders are lurking, hoping for the chance to acquire the item with a (literally) last second bid. This artificially suppresses the price of the item, and penalizes interested bidders who do not know of the competitive bids placed.

Known methods of conducting on-line auctions are also not optimized to accommodate all aspects of prior auction methods. For example, some prior known prior auctions provide certain rights for certain people. As a specific example, in the construction business, one contractor may have the right to match the lowest bid and be awarded the contract. This right is assigned even before the auction begins. Certain online auctions allow someone who placed an earlier initial bid than the high bidder to become the high bidder by merely matching the high bid and not having to actually outbid it. Auctions at the website Amazon.com offer the option that the first person to place an initial bid in the auction gets a 10% discount if he wins the auction.

In each of these cases, certain benefits are based on a ranking system. The first person to place his initial bid is in first place, the second person to place his initial bid is in second place, and so on. Once someone has a ranking of first or second place, there is no way to improve that ranking or lose that ranking. In this system, there is no advantage for the first ranked bidder to place a second bid until the final seconds of the auction because his ranking will not improve. There is also no advantage for him to bid initially more than the minimum required amount.

There is thus a need for a more equitable system which will assist a seller in realizing the full and fair price for auctioned items, and which will permit potential purchasers to have a fair chance to meet competitive bids to acquire thereby the desired items.

SUMMARY OF THE INVENTION

It is therefore an object of the invention to provide a method and system for conducting an on-line auction in which buyers are encouraged to bid earlier and higher than in current on-line auctions.

It is a further object of the invention to provide a method and system for on-line auctions in which a benefit system is established, whereby a buyer receives incentives to place bids early in the auction and/or in higher amounts than in prior auction systems.

It is a still further object of the invention to provide a method and system for conducting an on-line auction in which a buyer is accorded points for bids based upon how long the bid placed is the high bid, and by how much the bidder bids in excess of the prior high bid.

It is another object of the invention to provide an on-line auction method and system which may be used in reverse auctions and Dutch auctions to secure the most favorable terms of a bid for a seller.

Briefly stated, the invention is directed to a method and system for conducting an on-line auction, in which the bidding is weighted to encourage early bidding, and higher bidding. Each time a buyer places a new high bid on an item being offered at the auction, he is accorded a number of points, which is weighted to reflect the amount of the bid, either as an absolute value or as a relative increase in the high bid compared to prior bids. The bid may also be weighted to reflect how long the bid stays the high bid. In this fashion, the bidder is encouraged to place a bid early so that he will have the high bid for as long as possible, and to outbid higher bids, so that he collects as many points as possible. At the end of the auction, the bidder who has accumulated the most points under the system will receive a benefit, such as being allowed to match a higher bid, if someone outbids him at the last second, or being allowed to buy the item at a discount from the high bid, depending upon how many point were accumulated. The inventive system will therefore result in higher bidding, overall, for items offered for sale in this system, and therefore yield a more fair and accurate price of the item offered for sale.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
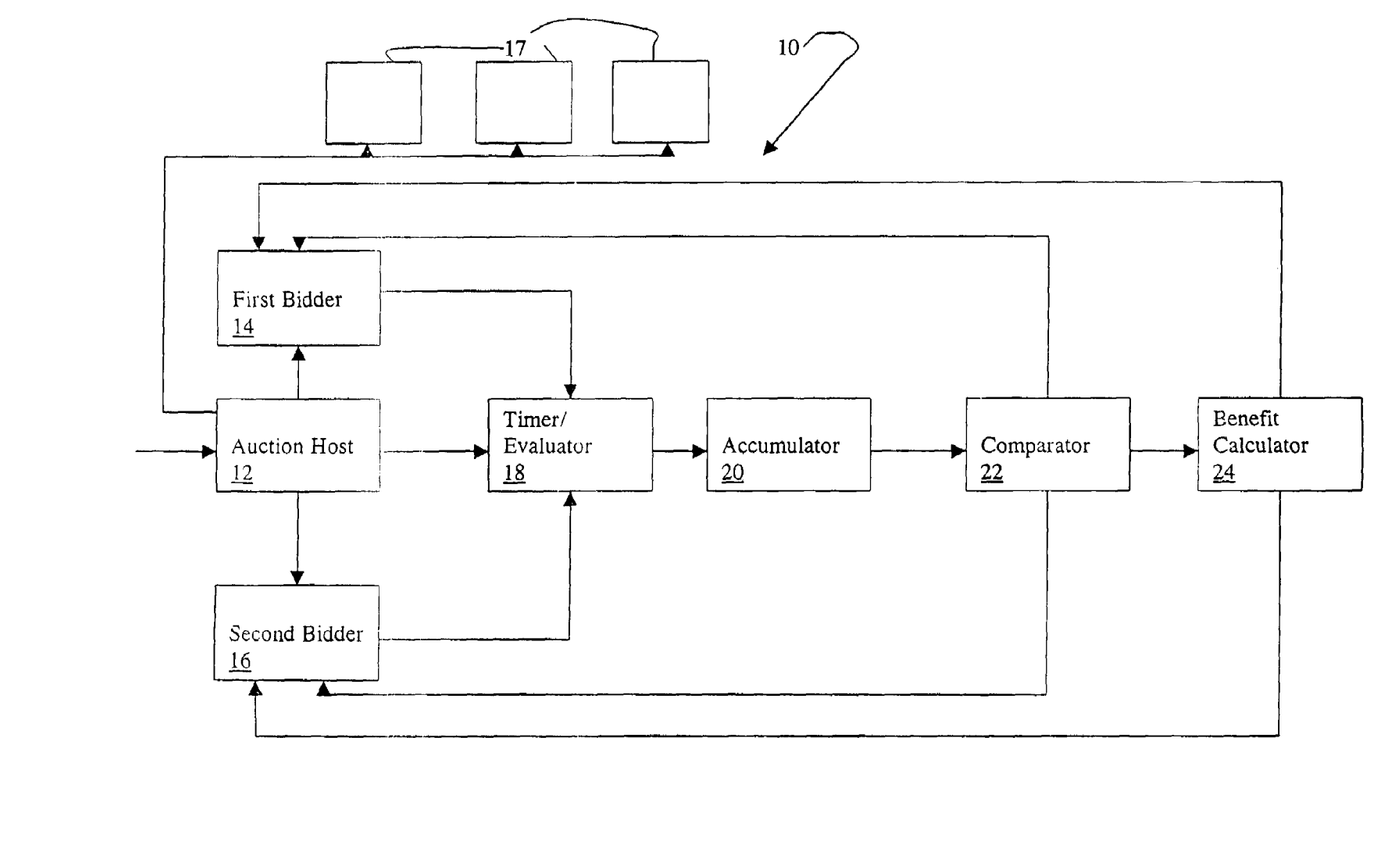
The FIGURE is a schematic drawing of an on-line auction system in accordance with the invention.

An inventive system in accordance with the invention is shown in FIG. 1, generally at 10. System 10 includes an auction host 12. Host 12 is a conventional auction hosting system, and is well known in the art. Host 12 provides a means whereby a potential seller may sign on to offer an item for sale. This may be done over the internet, by direct computer dial-up, through a local area network or other conventional methods. Host 12 also maintains a listing of offered items, and bids posted. Accounting for accepted bids is also performed by host 12. All of this is conventional and will not be described in detail here. It is sufficient to note that host 12 is capable of informing potential bidders of the items available for auction, and accepting bids from interested bidders. While it is generally hoped that there will be many bidders for each item offered for sale, and inventive system 10 can accommodate any number of bidders the system is illustrated as though there were only two bidders, first bidder 14 and second bidder 16, for simplicity. Other bidders 17 may be added without departing from the spirit and scope of the invention.

Host 12 is connected to a timer/evaluator 18 which maintains a list of the items offered for sale, the current high bids and the time remaining for the auction of each item. Timer/evaluator 18 will also receive the actual bids from first bidder 14 and second bidder 16, and relay this information to an accumulator 20 which will determine (in a manner described presently) how many points are accorded each bidder for each bid placed. Accumulator 20 will tally the amount of points accorded for each bidder, and transmit that information to a comparator 22 which informs first bidder 14 and second bidder 16 of their respective running totals of points accorded, and of their respective standings in the bidding at each moment.

First bidder 14 and second bidder 16 will be informed of the current high bids, and their respective positions in the hierarchy of bidding, so that they may make further bids, as necessary, up to their desired spending limits, to seek to place themselves in the best position to acquire the item up for bid.

At the conclusion of the auction, comparator 22 informs a benefit calculator 24 of the respective accumulations of points for each bidder. Benefit calculator 24 then determines which bidder has accumulated the most points, and identifies that bidder as the auction leader, who receives the predetermined benefit(s) as described below. Benefit calculator 24 informs each bidder 14, 16 of the results of the auction. It is possible that the auction may not end at the scheduled conclusion. There may be circumstances in which further bidding may follow in a second series of bids (called a "round" of bidding). If the auction leads to a second round of bidding, each permitted bidder is informed of his entry into the second round, and of his standing in the second round, so that it may be conducted in accordance with the rules thereof.

The key to the system described above is the methods of according points to the various bidders, and the benefits which may be provided to the auction leader as a result of the point calculations which form the basis for the invention.

The inventive method encourages bidders to place their initial bids early on, and to outbid others as soon as possible. In its simplest embodiment, the high bidder earns one point for each predetermined period of time (e.g. days, hours, minutes, seconds) during an auction for which he has the highest bid. At the end of the auction, whoever has the most points is the auction leader, who is given a benefit, such as the right after the close of the auction, to decide if he wishes to match the closing bid of the auction. If he chooses to, he can purchase the item at the closing price. Only if he declines to match the closing price during the time allotted can the person who actually placed the highest bid (i.e., the "winner" of the auction) purchase the auction item. This method provides several advantages over a conventional auction:

1) Anyone who hopes to win the auction at a low price cannot allow someone else to become the auction leader since the auction leader will merely match his bid after the auction. Hence, if a bidder truly wants to be guaranteed the right to purchase the item, he must become the auction leader, which entails successively higher bids.

2) This method encourages bidders to place a bid on an item early on in the auction when the price is still far below the worth of the item, since this bid, if left unchallenged, will enable him to become the auction leader.

3) The method further encourages other bidders to outbid the auction leader and not let him remain the auction leader for any significant period of time on such a low bid.

4) Furthermore, if someone joins the auction near the end of the auction period, he not only has to place the highest bid, but he must insure that that bid is high enough that it will not be worthwhile for the auction leader to match. This ensures that the ultimate highest bid will be as high as possible.

5) These factors cause the item to attain a price close to the winning bid earlier in the auction process.

6) This method also prevents late bidders from winning the item on an artificially low bid, thereby increasing, on average, the price by which an item is ultimately sold.

7) The inventive method further gives bidders a more realistic view of the final price of the item earlier on in the auction, giving them more confidence that an early, fair bid will not be outbid at the last second with a higher, but still low, bid.

Points and Rewards

The above example is merely the simplest method of calculating points (e.g., a bidder earns one point for every subdivided period he has the high bid), and one method of rewarding those who have earned points (e.g., the bidder with the most points can purchase the item at the closing price). It is also contemplated that there are other, more refined, methods of calculating points and rewarding those who have earned points. Some possible methods of according points, and providing benefits will be described in more detail below. All of these methods are within the scope of the present invention.

Points vs. Ranking

According to the inventive method, there is a "point" system. A bidder can earn points on each and every bid. Every point that a bidder does not earn is a point available for another bidder to earn. Even a bidder with a lot of points is at risk to lose his standing when other bidders make new bids and earn additional points. Therefore the inventive system encourages "good behavior" (i.e. bid early, bid high, quickly outbid those who outbid you) throughout the auction, by ensuring such behavior is rewarded throughout the auction process.

Additionally, some of the rewards mentioned are themselves innovative and would be new and non-obvious improvements over the standard online auction, even if they would be awarded based on a "ranking system" (and not on a "point system").

Points

The system of calculating points is designed to encourage bidders to bid as early as possible, to maintain their high bid as long as possible, to place the highest bid, or some combination thereof.

EXAMPLE 1

A first embodiment of the inventive method is to accord points solely on the basis of the length of time (e.g., the number of seconds) that a particular bidder has the high bid. This encourages bidders to place initial bids early in the auction, and to outbid higher bids quickly. The period in which points are accorded for maintaining the high bid may begin with the start of the auction.

If there is concern that it may take some people longer to become aware of the auction, there are ways to avoid putting such potential late entering bidders at too great a disadvantage. For example:

a) The period in which points begin to be accorded for maintaining the high bid need not be at the beginning of the auction, but can be at a specified time before the deadline (e.g. 3 days before the deadline, or 2 days after the item is first up for bid).

b) You can also "measure" or credit the "time" differently at different points of the auction process, i.e. alter the number of points accorded for being the highest bidder during each predetermined period of time (e.g. per second). For example, having the highest bid in the final day may count as double points.

Points may also be accorded for every subdivided period a bidder maintains the high bid, but only if he outbid the previous high bid by a certain amount. For example, assume the minimum bid increment is $1 and the minimum point increment is $5. If the current bid is $27 and one wishes to place a bid, he will have to bid at least $32 otherwise the new high bidder receives no points, even though he is now the high bidder.

If the time increment is in minutes, and someone had the high bid for less than a minute, there are several possible methods of according points. Either a fraction of a point may be accorded, or no points, since that bidder did not maintain his position as high bidder for the minimum time period. Alternatively, a full point can be accorded to whoever had the high bid for the majority of the minute, or to whoever had it for the highest percentage of the minute. It is also contemplated that the point could be accorded to whoever is the high bidder at the end of each minute, or on some other basis.

EXAMPLE 2

A second embodiment is to accord points solely on the basis of by how much each person increases the high bid. For example, if a bidder increases the high bid by $1 he earns one point. If he later increases the high bid by $2.50 he earns an additional two and half points, giving him a current total of three and a half points. There is therefore some incentive to quickly outbid by the greatest amount possible, and not merely by the minimum increment, as is usually done in auctions.

To prevent the initial bidders from having too much of an advantage, there can be a minimum acceptable bid amount (which may be a fixed amount or a percentage above the minimum opening bid) called the "floor". Points will only be accorded when the high bid is increased above the floor. For example, if the high bid is $180, the floor is $200, and someone bids $230, he will earn 30 points, if he bids $190, he is accorded no points.

EXAMPLE 3

In a third embodiment, points may be accorded based on the current bid and by how much (i.e. the incremental amount) a successive bidder outbids the current bid. For example, if the minimum increment is $1, the current bid is $20 and a bidder bids $25, he earns 21+22+23+24+25 (i.e. 115) points. If the next bidder bids $27, he earns 26+27 (i.e. 53) points. (Of course there can still be a floor amount below which no points are accorded.) The reason to accord 21+22+23+24+25 points, and not simply 25 points, is that there should be no greater advantage in bidding several small incremental bids (first $21, then immediately $22, etc.) than there is in bidding one large increment bid. This can encourage early bidding, while allowing those who join in the auction late a chance to catch up and become the auction leader.

Assume, for example, the minimum increments is $5, the current bid is $34 and bidder A bids $41. There can be several ways of calculating bidder A's points.

a) Bidder A can earn 39 points for raising the bid from $34 to $39, but to earn additional points he would have to raise the bid to $44 because that would be the next $5 increment.

b) Bidder A can earn 41 points; thus, if he bid $44 he would have earned 39+44 points reflecting his bid past two separate increments.

c) Bidder A can earn 35+40 points for increasing the bid past the $35 mark and past the $40 mark. Since the bidder must increase the bid by at least $5, the new bid will certainly pass at least one multiple of $5 necessary for the bidder to receive points. This also encourages bidders to bid an amount which is a multiple of $5, for otherwise, they enable the bidder who outbids them to get points for reaching a $5 mark while bidding less than $5.

d) Another possibility is to multiply the amount of the bid by the amount by which it outbid the previous bid. Bidder A will then earn 41*7=287 points.

e) In another variation, instead of a new bid being accorded more points than the earlier bids, it is accorded proportionately less to encourage early high bids. One possible formula would be:

$$P_n = B_H + B_1 - B_n$$

where $P_n$=Points accorded for bid "n"

$B_H$=Amount of High Bid $B_1$=Amount of First Bid $B_n$=Amount of Bid "n"

Assume the initial bid was $20 and the winning bid was $70. In this scenario, the bidder who placed a $25 bid will earn (70+20−25)=65 points, and the one who bid $70 will earn 20 points (70+20−70).

A further embodiment is to accord points based on increments in combination with predetermined timing considerations. For example, the seconds in which a bidder had the high bid multiplied by the amount by which he outbid the previous high bid determines how many points he earns. Thus, if a bidder increases the high bid from $25 to $32 he earns seven points for every subdivided period (e.g., every second) he maintains that high bid. If he later bids $34 he earns nine points for every second from that point onward until he is outbid. If someone else bids $35, that person earns one point per second. This can encourage outbidding by more than the minimum increment. That in turn may encourage someone else to quickly outbid the bidder who just increased the high bid by a large amount, so as to prevent that person from getting too many points too quickly.

Of course, this example can support all of the variations mentioned in the above-described embodiments (floor amount, double points time periods, etc.)

EXAMPLE 5

A fifth embodiment is to accord points based on the amount of the bid in combination with the time that the bid remains the high bid. For example, if a bidder bids $40 he gets 40 points per second that he maintains the high bid. If he then bids $45 dollars, he gets 45 points per second. If someone else bids $52, they get 52 points each second.

EXAMPLE 6

A sixth embodiment is to accord points based on a combination of any of the aforementioned schemes. Of course, points would have to be scaled so that points earned from one scheme are proportionate to points earned from another scheme. If they were not scaled, the points from one embodiment could completely overwhelm the points of the other. For example, assume the minimum increment is $1, the time increments are in seconds and the current bid is $20. If someone bids $25, he earns 21+22+23+24+25 (115) times 1 hours of points (3600) (414000 total), plus 25 points for every second (i.e. the subdivided period) he maintains the high bid. In other words, when he raises the bid past an incremental amount, he earns the number of points as if he had maintained that bid for an hour. The hour's worth of points is simply a way of scaling the points earned in 'example 3' to make them of a similar value to those earned in 'example 5'. The points in 'example 3' could be multiplied or divided by any number (perhaps 1000), but an hour of points (or perhaps, half an hour of points) may be a fair number.

EXAMPLE 7

Another embodiment of the inventive method is that every time a bidder places the high bid, he receives one point, and everyone who raised the high bid before him also receives one point. Therefore, if the high bid was raised on ten occasions, the person who raised it the first time receives a total of ten points for that bid. (i.e. once for each of the ten increases) Whoever raised it the second time receives nine points (i.e. once for every increase starting with his own) for that bid and so on. Of course, if someone raises the high bid by more than the minimum increment, this may count as raising the bid more than once. For example, if someone raises the bid by three times the minimum increment, he earns six points (3+2+1), while adding three points to the score of each of the previous bids.

EXAMPLE 8

A still further embodiment is that bidders earn points during the auction by using one of the methods above. At the close of the auction, each bidder has his amount of points multiplied by the highest bid he placed during the course of the auction. This number then becomes the amount of points he is considered to have earned when calculating what benefit he has earned as a result of his prior bids.

EXAMPLE 9

Another contemplated embodiment of the invention is to accord points for only those bids that reach certain predetermined milestones in the auction process.

a) For example, if an item is expected to sell for between $400 and $600, there can be 400 points for the first person to bid $400, and 600 points for the first person to bid $600. Alternatively, there may be 50 points for the first bid to pass each successive $50 interval. There may be as few or as many such milestones as the auctioneer feels is necessary. They many differ in the number of points they each earn. And they may either be revealed to the bidders or they may be kept secret. As an extreme example, there may be a certain secret amount which whoever is the first to bid that amount, is automatically the auction leader.

b) The milestones may also depend upon predetermined timing considerations, rather than dollar amounts. For example, whoever is the high bidder at the end of the first day earns 1000 points, and whoever is the high bidder at the end of the second day earns 2000 points and so on. Here, too, the milestones may be kept secret or publicized. On one extreme, points can be given to whoever has the bid at the end of each minute, which would merely be the example 1 listed above. On the other extreme, the bidder who has the high bid exactly three hours before the end of the auction is declared the auction leader no matter the result of any other bidding.

c) The milestones may also be based on a combination of time and dollar amount. For example, the first bid to reach $300 before the end of the first hour earns 100 points. The first bid to reach $400 before the end of the first day earns 200 points and so on.

Proxy Bidding

Many online auctions support proxy bidding in which a potential bidder enters the maximum bid he is willing to pay for the item (which is kept secret) and the auction will automatically raise the bid by the minimum necessary to insure that he has the high bid, until either the auction ends or the bidder's maximum bid limit is reached. For example, assume the high bid was $30 and the minimum increments is $2. Bidder "A" placed a bid of $35 and maximum of $48. Bidder "B" then comes along and bids $41. Bidder "A" has his bid raised automatically to $43. The question becomes how to accord points for this transaction. As a general rule, proxy bidding should be encouraged (it is far better than "sniping"—bidding in the last few seconds), but the process should be fair to the other person who raised the bid. From a time-point perspective, bidder B would receive no points since bidder A's bid was raised instantly and there was no measurable point in time in which bidder B had the high bid. From an increment-point prospective there can be two ways to handle this situation. Bidder B, can be accorded 37+39+41 points and bidder A, 43 points. Or bidder A can be accorded, 37+39+41+43 points. Again, if points are accorded based on time multiplied by increment, when bidder A raised his bid to 43, he either earns two points a second or 13 points a second. In each of these scenarios, it is preferable to accord bidder A the fewer number of points because we do not want him to use proxy bidding to avoid bidding a high initial price on the item. Also, bidder B should be encouraged to bid, even when bidder A is using proxy bidding, by either giving bidder B points, or at least giving him the opportunity to prevent bidder A from earning additional points. Which method is selected is a matter of design choice, and will depend upon all of the circumstances surrounding the particular auction, as weighed by the auction house.

Reward

Once points are accorded, and accumulated, the next consideration is what benefit should be conferred upon the auction leader.

Post Auction Bidding

The methods given in the original example give the auction leader an allotted period of time during which he has the right to match the closing bid and purchase the item at that price. (If a bidder is concerned he may be away from his computer at the close of the auction, he may choose to submit the price he would be willing to pay in a post auction bid earlier in the auction process. This amount would be kept secret, and may differ from the maximum amount of his proxy bidding.)

A second embodiment is that the auction leader cannot merely match the closing bid, but must outbid the closing bid by a certain fixed percentage, for example, between 2% and 10%, or a certain multiple of the minimum increment. This variation may be considered fairer to the person who placed the closing (winning) bid.

Another embodiment is a method in which the percentage or dollar amount, by which the bidder having the most points ("the auction leader") must outbid the highest closing bid if his bid is not the highest bid, is a variable percentage, for example, proportional to the number of points that the auction leader has accumulated (compared to the other bidders). For example, the formula may be as follows:

$$P=(M*(1-L/T))\%$$

where

P=the percentage by which the auction leader must outbid the high bidder.

L=the number of points which the auction leader has earned.

T=the total number points earned by all bidders including the auction leader.

M=the maximum percentage of premium required (for example 20%).

So if the auction leader earned 70% of the total points earned by all bidders, he must outbid the closing bid by 6%.

$$(P=20*(1-0.7)=6\%)$$

This embodiment offers the following advantage. Even if a bidder joins the auction at a point in time in which it is too late to become the auction leader, it still may be worth his while to earn some points. In doing so, he prevents the auction leader from earning those points, thereby increasing the amount by which the auction leader must outbid him, in the event the late bidder places the highest bid.

The percentage of the discount may also be proportional to the difference in points between the auction leader and the winner. For example, the formula may be as follows:

$$P=(M*W/L)\%$$

where

W=the number of points earned by the winner (the one who placed the highest closing bid) of the auction.

M=maximum discount offered (for example, 20)

So if the auction leader has 100 points and the winner has 40 points, the auction leader must outbid the closing bid by 8%.

Therefore, anyone hoping to acquire the desired item would want to increase his points, for if he becomes the auction leader, the item is guaranteed to be his. If someone else becomes the auction leader, he would want to decrease the point difference between himself and the auction leader, thereby forcing the auction leader to outbid him by a greater percentage. In any event, the ultimate price realized by the seller will increase, and the winner will not benefit by gamesmanship designed to keep the bidding down to an unrealistic low bid.

Discount

Yet another embodiment of the inventive method is that the bidder with the most points gets a discount on the price of the item. Assume that, if the auction leader wins the auction, he receives a 10% discount off the closing bid. Therefore, a winning bid of $500, which (hypothetically) beat the previous bid of $490, will enable the auction leader to purchase the item for $450. Of course, the percentage discount (or dollar reduction in price) the auction leader receives may be proportional to the number of points the auction leader accumulated by the auction leader, or proportional to the number of points the auction leader accumulated more than the bidder who placed the highest bid. For example, the formula may be as follows:

$$R=(M*(L/T))\%.$$

where

R=the percentage reduction in price which auction the auction leader receives on the item if he wins the auction.

M=the maximum percentage reduction offered the auction leader (for example, 20).

So if the auction leader earned 70% of the total points earned by all bidders, he receives a 14% discount off the item.

Another embodiment is to have discrete categories in which the auction leader falls into depending on the amount of points he has earned.

For example, the categories may be as follows:

If $(L/T)<0.25$, $P=10\%$

If $0.25<L/T<0.5$, $P=5\%$

If $0.5<(L/T)M\ 0.75$, $P=2\%$

If $0.75<(L/T)$, $P=0\%$

Additionally, if $(L/T)>0.9$, the auction leader gets a 2% discount off the winning bid. (Perhaps only if he placed the winning bid, or perhaps even if someone else did.) The categories may also be based on the absolute number of points the auction leader has earned, and not based on percentages.

There is still another embodiment, which may not be advantageous to the person who placed the highest bid, but which would change the dynamics of the auction process. The person with the most points can purchase the item at the highest price for which he bid for the item, regardless of the fact that people with fewer points than him many have outbid his highest bid. Of course, the rules may be that the person with the most points can only purchase the item at his highest bid, and not have to match the highest bid, if he earned a certain percentage of the total points accorded.

Cash and Prize Rewards

Another possibility is to give bidders a benefit apart from the auction, such as a cash reward. The motivation to do this is as follows: Since their bids raised the price of the item, thereby enabling the seller (and the auction house which earns usually a percentage of the sale) to earn more money, it is only fair that the bidders be rewarded for the revenue they helped generate. Of course, the amount each bidder contributed must be determined. To calculate that, one of the point systems mentioned above may be utilized.

There may also be a method of rewarding the bidders. Several such methods are listed below. A cash reward may also be used in addition to one of the auction leader-based rewards listed above.

a) One method is that a certain percentage (e.g. 5%) of the sale price of the item is divided among those bidders who earned a certain minimal amount of points, based on the percentage of the total points accorded each of those bidders has earned.

b) A second method is that each point has a specific cash value. For example, every point can have a cash value of $0.001. To become the high bidder, someone must not only top the winning bid but he must also compensate all previous bidders by paying them the cash value of the points they earned (if he wins the auction and purchases the item.) Therefore, assuming the high bid is $30, the minimum increments is $1 and 5,000 points (with a cash value of $0.001 per point) were earned by bidders other than that bidder, someone would have to bid $36 to become the high bidder—$31 toward the auction bid and $5 toward the previous bidders (in total). Meanwhile, the points he earns from becoming the high bidder will require the next bidder to bid more than $5 toward the previous bidders in addition to bidding at least $32 toward the auction item.

c) Alternatively, the points earned may be redeemed for some other prize. The auction house usually earns a percentage of the sale price of the item, and they can use that money to reward those who have earned points. Points can be redeemed for prizes such as participation in an awards program (e.g. frequent flyer program or magazine subscriptions). Another option is that points can be redeemed for either cash rebates or credit toward the next purchase made at that auction house.

Take-It Price

Some auctions allow a Take-It price, in which, if a bidder places a bid above a certain price, the auction ends immediately. In an auction conducted in accordance with an embodiment of the inventive method, if a bidder places a bid that exceeds the Take-It price, the auction leader will not have the right to place a post-auction bid.

Proxy Bidding

In a situation where the bidder who placed the highest bid used proxy bidding, it is possible to allow his proxy bidding to outbid the auction leader's post auction bid. In such a situation, the auction leader is informed of the fact that the new high bidder is using proxy bidding. The previous auction leader may then choose to bid more than the minimum necessary under the point and reward system, to outbid the limit on the winner's proxy bidding. Alternatively, in addition to bidding the minimum necessary under the point and reward system, the previous auction leader can use his own proxy bidding, in order to compete against the high bidder's proxy bidding. Thus, whoever places the highest bid is permitted to acquire the item.

Multi-Person

Further embodiments related to multi-person bidding are described below.

a) If the auction leader declines to purchase the item, the person with the second most number of points (i.e. the second-place auction leader) may purchase the item. This will be conducted as follows. Everyone with more points than the high bidder must decide within an allotted period of time whether to submit a request to outbid the closing (and highest) bid; that is, if they wish to purchase the item at the price they would be required to in order to outbid the winner. What that price is depends on several factors, for example: how many points that particular bidder has, the closing price of the item, and which of the above examples is being used—matching, outbidding by fixed percentage, variable percentage, etc. If one of the above formulae is used, the comparator 22 replaces the value of the auction leader's points with the value of the particular bidder's points, in order to determine the percentage by which the particular bidder would have to outbid the highest bid. In case of conflicts, the request of the bidder with the most points will be honored.

Yet another variation is that anyone with at least the number of points accumulated by the high bidder (including the high bidder himself) is invited to participate in a second round auction. One version of this second auction is a sealed bid auction: Everyone has two minutes to submit a bid, and the bids are kept private. When the two minutes are up, the bids are compared by comparator 22, and whoever submitted the highest bid wins the auction. (Of course, only bids greater than the closing bid of the first auction by the prescribed amount (if applicable) are accepted. If no such bid is placed, the winner of the first auction is entitled to purchase the item at the closing price.) In case of a tie between two or more bids, the points earned by the bidders determine who wins. In case of a tie in points also, whoever earned his initial point first, wins. Alternatively, whoever earned all of his points first, wins.

Another way of conducting the second round sealed bid auction is as follows. Everyone has 5 minutes in which to submit a secret bid, but the score of these bids is calculated as follows. The points earned in the first round, times the amount the of second bid, is the score of the second round bid. Whoever submits the bid with the highest composite score wins the second round auction at his sealed bid price. The minimum acceptable score for a bid is the closing bid of the first auction, times the amount of points the auction leader earned in the first auction. If no second round bid has a score that high, the winner of the first round of the auction can purchase the item at the closing price. In case of a tie, the person with the most first round points wins. Alternatively, the person with the higher second round bid wins.

Another variation of the above is as follows. Once the amount of points accumulated in the first round gains a bidder entry into the second round, the second round may be opened to everyone. Anyone who earned any points in the first round can submit a bid in the second round. Of course for someone who earned minimal points in the first rounds to submit a second round bid with a sufficient score to win, he would have to bid well above the closing price.

A variation of the "reduced price" reward embodiment is that everyone gets a reduction in price depending on the number of points they have. For example, the formula may be as follows:

$$Br=(M*(B/T)) \%.$$

where

B=where the number of points which a particular bidder earned.

Br=the percentage reduction in price which any bidder receives on the item if he wins the auction.

M=Maximum percentage reduction in price (for example, 20)

Display

During the course of the auction, the number of points each bidder has earned may be displayed to all of the bidders along with the bidder's bidding identity and his bid price. There may also be an on-line "point calculator" available as part of accumulator 20 which anyone can use to calculate how many points they could earn on a certain bid if they maintain it for a certain period of time. They can also calculate how many points the other bidders could earn if they were to bid a certain amount, or if they maintain their bid for a certain period of time. The "calculator" would also translate the number of points they have into the reward they would earn, based on either the total current points earned at that point of time, or based on whatever assumptions the bidder would enter. The "calculator" would also do reverse calculations: A potential bidder could ask it how much he would have to bid or how long he would have to maintain that bid, to become the auction leader.

Multiple Item Auction ("Dutch Auction")

Dutch Auctions are auctions where the seller has multiple, identical items he wishes to sell. The seller specifies the minimum starting bid and the number of items available. A bidder may bid on one or more of the items (it is not necessary to bid on the entire quantity). At the end of the auction, bidders with the highest bids will win the quantity they bid on. In the event of a tie in the high bid, the bidder with the greatest number of items bid on will prevail. In the event of a tie in both high bid and quantity, the first tie breaker would be the earlier time each bidder placed a bid on this particular lot. The quantity is divided up between the winning bidders until there are none left. Often times a bidder will have a winning bid, but only a partial quantity is left at their bid level. In this case the bidder is expected to accept whatever quantity remains. In some versions everyone pays the price of the lowest winning bid. In other versions, each bidder pays the price of their winning bid.

The problem with multiple-item auctions is that the rules are inherently a bit complicated. Adding an additional set of rules for calculating points and rewarding the auction leaders runs the risk of making things too confusing for some people. This may remove the incentive for "good behavior" that the inventive system is meant to provide. Many of the versions that follow may therefore not be suitable for auctions of consumer items. They may however be suitable for auctions where most of the bidders are sufficiently sophisticated to operate comfortably in a complex bidding environment.

A first preferred embodiment is as follows. Every time a bid would have enabled a bidder to purchase a particular item, he earns points enabling him to match the winning bid on that item. For example, assume points are accorded for every second a bidder has the high bid, twenty items are for sale, and Bidder A places a high bid, with a request for 2 items. For every subdivided period (e.g. every second) Bidder A has the high bid, he earns points toward the first and second item. If Bidder B then matches Bidder A's bid with a request for three items, Bidder B then earns points for items #1, #2, and #3, and Bidder A then earns points for items #4 and #5. Each item therefore has a bidder who has earned the most points for that individual item. That person is identified as the "item leader". However, the bidder who placed the winning bid on item #1 should be treated better than the person who placed the winning bid on item #20 since the bid for item #1 is higher than the bid for item #20. Therefore, the item leader for item #1 can match the bid on item #20 and purchase item #20. The item leader for item #2 can match the bid on item #19 and purchase item #19. If the high bidder declines to match the bid on item #19, the item leader for item #3 can then match the bid on item #19 the item, and so on. Thus, if any of the item leaders declines to match the winning bids, the person who placed the winning bid on item #1 will be able to purchase item #1. And all the item leaders will have to decline to match their respective bids in order for the winner of item #20 to purchase an item.

A second embodiment for a Dutch Auction is as follows: for every subdivided period (e.g., second) a bid enables a bidder to purchase one item, he earns one point in category 1. For every subdivided period (e.g. second) that bid qualifies him to purchase two items, he earns one point in category 1 and one point in category 2. When the auction process is completed, the top twenty scores are accumulated (assuming twenty items are being auctioned off) regardless of which category 1 through 20 the score is in. The bidder with these scores can match the highest bids for each item. (Once again, the highest score matches the bid for item #20 and if he declines, the second highest bid matches item #20, etc.)

A drawback to the first Dutch Auction embodiment is as follows: Someone can have the most points overall, if his points on items 1 through 20 were accumulated, yet not be the item leader for any particular item since his points are divided among the various items. That may be perceived as 'unfair.' The second embodiment addresses this problem, yet creates another.

It may not be considered "fair" for the person with the bid entitling him to item #20 to earn as many points as the person with the bid entitling him to item 1. A third embodiment is a variation of the second embodiment, which addresses this problem. For every predetermined time period a bid is the high bid item for #1, the bidder earns points (corresponding to the number of items in the auction, here 20 points). If a bid is the high bid for item #2, the bidder accumulates a lesser number of points (for example, 19) per predetermined period, and so on. Like the second embodiment, the points earned toward the first item go to category one; the points earned toward the second item go to category two, and so on.

A fourth embodiment is a variation of the third, in which the points earned per second is further multiplied by the value of the bid.

Of course all of the variations mention in a single item auction (double points time periods, floor amounts, etc.) may also apply in a Dutch Auction.

If points are accorded based on the amount of the increment, there are two possible ways to calculate them. (1) A bidder may accumulate points for all the currently high bids which he outbids. (2) The bidder only accumulates points for those bids that are no longer high bids due to his bid. For example, in a five-item auction, assume the current high bids are $30, $28, $25, $25, and $23. If a bidder bids $29, according to the first formula he earns (29)+(29+28+27+26)+(29+28+27+26)+(29+28+27+26+25+24)=408 points. According to the second formula he earns (29+28+27+26+25+24)=159 points. If, instead of bidding $29 on one item, he bids $29 on two items, the points are accumulated as follows. According to the first formula the bidder accumulates 408 points for the first item, and (29)+(29+28+27+26)+(29+28+27+26)=249 points for the second item. According to the second formula the bidder accumulates 159 points on the first item, and (29+28+27+26)=110 points on the second item.

If the bidder matches the price of the lowest winning bid but increases the number of items, (for example, bid $23 on two items in the above example) no increment points are accorded.

From the perspective of the increment point system, when the auction begins it is as if each of the items has an opening bid. The worth of these initial bids should be considered to be the amount of the minimum acceptable bid. They may, however, be given a value above that (a floor value) or a value below that, or even no opening price at all (i.e. $0).

An interesting situation is when the high bidder of an item is also an item leader. For example, the winner of item #1 is also the overall point leader. May he match the bid for item #20 and purchase item #1? The rules may either allow such a possibility, or they may restrict it, depending on how much the leaders are to be rewarded. Therefore, if a bidder won two items and is the item leader on five items, the rules may only allow him to be item leader for three items.

May the bidder match the bid for item #20 and use that as an excuse to exempt himself from purchasing item #1 (in those versions of Dutch Auctions in which all bidders don't pay the price of the lowest winning bid)? To avoid that later situation, the rules may require that in a Dutch Leader Auction, all item leaders pay the price of the lowest winning bid.

Another possible variation, which can be used in combination with the above versions, is to incorporate directly the point scheme or system into the rules of the auction. Instead of the high bids securing the individual items, with quantity breaking a tie in price, and earlier initial bids breaking a tie in quantity, the point system can play a direct role in determining who won the auction. In case of a tie in price, points are the determining factor. Only if there is a tie in points are quantity and time of initial bid factors. Alternatively, points serve as a tiebreaker in quantity, rather than time of initial bid serving as a tiebreaker in quantity.

Reverse Auction

In a reverse auction, the bidder who places the lowest bid sells the item for that price or performs the service for that price, thus a lower bid is "worth" more then a higher bid. Some of the rules of the "point and reward" would have to be adjusted to be suitable for a reverse auction. For example, points are accorded for every second a bidder has the lowest bid, and for how much they decrement the lowest bid. If according points for the worth of a bid, a lower bid should be accorded more points than a higher bid. A simple way to accomplish this is as follows. There is an initial maximum acceptable bid to begin the auction. The points accorded for a particular bid will be based on the value of the initial maximum bid minus the value of that particular bid. For example, if the auction begins at a maximum price of $600, and someone bids $550, he will receive 50 points for every second he maintains the low bid. If the minimum decrement is $1 and someone lowers the bid from $450 to $447, he earns 151+152+153=456 points.

Still Other Variations

It is also contemplated that the invention also includes within its scope all games in which auctions are included in their rules of play.

It is also contemplated that the invention also includes within its scope auctions where a cash value is not the sole criterion in determining a winning bid. For example, if the worth of the winning bid is based on a combination of factors (time for delivery, credit terms, etc.), as long as there is a method to determine the current bid having the greatest "worth" at every point in the auction, there can be an "auction leader" calculated based upon the above formulae to determine the true worth of the bids as a function of predetermined weighing criteria established by the auction house, considering the non-monetary value of the bid criteria.

Optional Rules

The point and reward system turns the auction process into a sort of game, and therefore various elements from different games can be appropriately incorporated into the inventive system.

For example, there can be a random leader. The auction leader is chosen at random at the end of the auction. The percentage of the total points accorded a particular bidder has earned will determine his odds of becoming auction leader. For example, someone who earned 20% of the total points accorded has a 20% chance of becoming auction leader.

There may also be a rule that if a bidder outbids someone by a certain percent (perhaps 100%) or a certain dollar amount, that person loses all of his points. The rule may even be that the new bidder gets the points of the old bidder. The old bidder could also have the right to defend his points. If he regains the high bid within a certain period of time (or if his proxy bidding automatically outbids the new bid), he can then keep his points.

The rules may also establish that points do not expire at the end of auction. Any points which did not enable a bidder to become auction leader, and which were not otherwise rewarded, may be used toward the next auction in which the bidder participates. However, all points that are being transferred to a new auction must be done so before a predetermined time early in the auction.

Variable Increment

The inventive system may also reward bidders at any time during the course of the auction based upon the points accumulated up to that time.

There is another method to encourage "good behavior" in an auction that can be a part of the point-and-reward system, or may be independent of it. Instead of having the minimum increment remain static throughout the auction, the minimum increment may vary in a manner that will encourage people to bid early, and to outbid those who outbid them quickly.

1) Version 1 is as follows. The longer a bid remains the high bid, the greater amount people have to outbid it by.

2) Version 2 is that the amount of the minimum increment depends on either the amount of points accumulated by the high bidder, the amount of points accumulated by the person who wants to outbid him, or both. Therefore, the more points that are accumulated, the easier it is for that bidder to outbid other bidders, and the more difficult it is for them to outbid him.

3) Version 3 is if a bidder has more points than the high bidder, he can match that bid at any point in the auction and become the high bidder.

4) Version 4 is a variation of version 2, in which the determining factor is not points, but the ranking of when the bidder joined the auction by placing his initial bid.

It will be appreciated that no single point and reward method would be best suited for all possible auctions, and that one of ordinary skill in the art would be able to select the specific method that would be best suited for the auction of a specific item. For inexpensive items, for example, required increments of $5.00 may be far too high, while for high end auctions of expensive art, $1,000.00 increments may be too small. If an auction is scheduled to last for a few weeks, calculating points on a second-by-second basis may be unfair to later bidders, and skew the calculations.

All of these factors may be taken into account.

It is contemplated that the item offered for auction may be a product and/or a service and/or anything that is available to be bought and sold.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for conducting an auction, comprising the steps of:

offering at least one item for sale over a computer network, for a first predetermined period of time;

receiving a first bid for said item from a first bidder over said computer network;

according a first value to said first bidder as a first function of at least one of a timing of said first bid and a worth of said first bid;

receiving at least one succeeding bid for said item from at least one other bidder over said computer network;

according a second value to said at least one other bidder as a second function of at least one of a timing of said succeeding bid and a worth of said second bid;

accumulating values accorded said first bidder for each bid placed by said first bidder during said auction;

accumulating values accorded each said at least one other bidder for each bid placed by said at least one other bidder during said auction;

comparing said accumulated values of said first bidder with said accumulated values of each said at least one other bidder;

identifying an auction leader based on a third function of said comparison of said accumulated values of said first bidder with said accumulated values of each of said at least one other bidder;

closing said auction to all further bids by any bidder other than said auction leader after said first predetermined period of time;

permitting said auction leader to make one final bid after said auction is closed, thereby encouraging bidders to attempt to become the auction leader by bidding early and maintaining the high bid throughout the auction.

2. The method of claim 1, wherein said first function and said second function are substantially identical.

3. The method of claim 1, wherein said first function and said second function are different.

4. The method of claim 3, wherein said first function accords a greater value to the earliest bid of a group of substantially identical bids, thereby encouraging bidders to bid to secure greater value for their bids in comparison with other bidders.

5. The method of claim 1, wherein said first value decreases over time, until said first bid is made, during said first predetermined period of time, thereby encouraging early bidding on said item.

6. The method of claim 1, wherein said second value decreases over time, until said second bid is made, during said first predetermined period of time, thereby encouraging early bidding on said item.

7. The method of claim 6, wherein said first value decreases over time, until said first bid is made, during said first predetermined period of time, thereby encouraging early bidding on said item.

8. The method of claim 1, wherein said first function increases said accumulation of said first value during the time said first bid is worth more than other bids.

9. The method of claim 1, wherein said second function increases said accumulation of said second value during the time said succeeding bid is worth more than all other bids.

10. The method of claim 1, further comprising the steps of:

comparing said worth of said first bid and said worth of said at least one successive bid;

accumulating said value accorded said first bid when said worth of said first bid is greater than said worth of said at least one successive bid;

accumulating said value accorded said at least one successive bid when said worth of said at least one successive bid is greater than said worth of said first bid.

11. The method of claim 10, wherein said comparing of said worth of said first bid with said worth of said at least one successive bid is performed on a substantially continuous basis.

12. The method of claim 10, wherein said comparing of said worth of said first bid with said worth of said at least one successive bid is performed at predetermined times.

13. The method of claim 12, wherein said predetermined times are incremental time periods.

14. The method of claim 13, wherein said incremental time periods are days.

15. The method of claim 13, wherein said incremental time periods are hours.

16. The method of claim 13, wherein said incremental time periods are minutes.

17. The method of claim 13, wherein said incremental time periods are seconds.

18. The method of claim 10, wherein said accumulating of said values accorded to any bidder occurs each time said worth of a bid placed by said bidder exceeds a worth of all preceding bids.

19. The method of claim 1, wherein a worth of a successive bid is required to be greater than a worth of a preceding bid by no less than a minimum increment, and wherein at least one of said first function of said timing of said first bid and said second function of said timing of said second bid accords a value which increases if said worth of said successive bid is greater than said worth of said preceding bid by more than said minimum increment, thereby encouraging successive bidders to place a bid having a worth in excess of said predetermined minimum increment plus said worth of said preceding bid.

20. The method of claim 19, wherein said minimum increment is fixed.

21. The method of claim 19 wherein said minimum increment is an eighth function of an accumulation of values accorded to a bidder.

22. The method of claim 1, further comprising:
establishing a floor value of a bid on said item, and said according values to at least one of said first bid and said at least one successive bid depends upon the amount by which said at least one of said first bid and said at least one successive bid exceeds said floor value.

23. The method of claim 1, wherein at least one of said first function and said second function accords a value based upon at least one predetermined timing consideration.

24. The method of claim 23, wherein said at least one predetermined timing consideration is the time of day.

25. The method of claim 23, wherein said at least one predetermined timing consideration is proximity to the end of said first predetermined period of time.

26. The method of claim 23, wherein said at least one predetermined timing consideration is the duration of the period any individual bid has remained the bid having the greatest worth.

27. The method of claim 23, wherein said at least one predetermined timing consideration is having the bid with the greatest worth at predetermined time milestones.

28. The method of claim 1, wherein at least one of said first function and said second function accords a value based upon at least one predetermined worth criterion.

29. The method of claim 28, wherein said at least one predetermined worth criterion is being the bidder who places the first bid.

30. The method of claim 28, further comprising:
establishing a floor value of acceptable bids for said item; and
wherein said at least one predetermined worth criterion is being the initial bidder who places a bid in excess of said floor.

31. The method of claim 28, wherein said at least one predetermined worth criterion is being the initial bidder to meet at least one predetermined bid worth threshold.

32. The method of claim 1, further comprising:
continuing said auction after said first predetermined period of time for a second predetermined period of time;
limiting participation in said auction during said second predetermined period of time to bidders based upon a fifth function of the total accumulated values of bids for each said bidders accorded during said first predetermined period of time; and
closing said auction after said second predetermined period of time.

33. The method of claim 32, wherein bids placed during said second predetermined period of time are weighted as a sixth function of accumulated values of bids placed during said first predetermined period of time.

34. The method of claim 1, wherein said auction leader is accorded a benefit apart from said auction.

35. The method of claim 34, wherein said benefit is monetary in nature.

36. The method of claim 35, wherein said benefit includes a credit against future auction purchases.

37. The method of claim 35, wherein said benefit includes participation in an awards program.

38. The method of claim 1,
wherein at least two substantially identical items are offered for sale;
wherein bidders are permitted to bid on more than one of said at least two substantially identical items;
wherein each bidder must specify how many of said at least two substantially identical items are being bid upon, and the amount of said bid; and
wherein values are accumulated for each bid on each item.

39. The method of claim 38, wherein said values of each bid on each item are accumulated separately by bidder; and further comprising the step of identifying an item leader for each item offered for sale.

40. The method of claim 39, wherein a benefit is accorded each item leader.

41. The method of claim 1, wherein at least one of said first function and said second function is accumulated for all bids placed by each individual bidder up to a specific time.

42. The method of claim 41, wherein said specific time is at the end of said first predetermined period of time.

43. The method of claim 41, wherein said specific time is at the time of placing each bid.

44. A system for conducting an on-line auction, comprising:
means for offering at least one item for sale over a computer network, for a first predetermined period of time;
means or receiving a first bid for said item from a first bidder over said computer network;

means for according a first value to said first bidder as a first function of at least one of a timing of said first bid and a worth of said first bid;

means for receiving an at least one successive bid from at least one other bidder over said computer network;

means for according a second value to said at least one other bidder as a second function of at least one of a timing of said second bid and a worth of said at least one successive bid;

means for accumulating all values accorded said first bidder for each bid placed by said first bidder during said auction;

means for accumulating all values accorded each of said at least one other bidder for each bid placed by each said at least one other bidder during said auction;

means for comparing said accumulated values of said first bidder with said accumulated values of each said at least one other bidder;

means for identifying an auction leader based on a third function of said comparison of said accumulated values of said first bidder with said accumulated values of each of said at least one other bidder; whereby only said auction leader is permitted to make a single final bid after said first predetermined period of time, thereby encouraging bidders to attempt to become the auction leader by bidding early and attempting to maintain the high bid throughout the auction.

45. The system of claim 44, further comprising:

means for comparing said worth of said first bid and said worth of said at least one successive bid;

means for accumulating said value of said first bid when said worth of said first bid is higher than said worth of said at least one successive bid;

means for accumulating said value of said at least one successive bid when said worth of said at least one successive bid is higher than said worth of said first bid.

46. The system of claim 44, further comprising:

means for establishing a floor value of a bid on said item, and said according values to at least one of said first bid and said second bid depends upon the amount by which said at least one of said first bid and said at least one successive bid exceeds said floor value.

47. The system of claim 44, further comprising means for providing a discount to said auction leader; and means for comparing the total of accumulated values accorded to said auction leader during said auction, to the total accumulated values accorded to said at least one successive bidder during said auction; and wherein said amount of said discount is an eighth function of said comparison of said total of accumulated values accorded to said auction leader during said auction, to said total accumulated values of said at least one successive bidder during said auction.

48. The system of claim 44, further comprising:

means for continuing said auction after said first predetermined period of time for a second predetermined period of time; and means for limiting participation in said auction during said second predetermined period of time to selected bidders based upon their total accumulated values for bids accorded during said first predetermined period of time.

* * * * *